United States Patent
Riggs, Jr.

(10) Patent No.: US 8,936,728 B2
(45) Date of Patent: Jan. 20, 2015

(54) CHEMICALS FOR OIL SPILL CLEANUP

(76) Inventors: Olen L. Riggs, Jr., Yukon, OK (US);
Debra A. Riggs, legal representative, Yukon, OK (US)

( * ) Notice: Subject to any disclaimer, the term of this patent is extended or adjusted under 35 U.S.C. 154(b) by 506 days.

(21) Appl. No.: 13/220,147

(22) Filed: Aug. 29, 2011

(65) Prior Publication Data

US 2012/0048809 A1  Mar. 1, 2012

Related U.S. Application Data

(60) Provisional application No. 61/378,475, filed on Aug. 31, 2010.

(51) Int. Cl.
*C02F 1/68* (2006.01)
*C02F 101/32* (2006.01)
*C02F 103/00* (2006.01)

(52) U.S. Cl.
CPC ............. *C02F 1/682* (2013.01); *C02F 2101/32* (2013.01); *C02F 2103/007* (2013.01); *Y10S 210/925* (2013.01)
USPC ............................ 210/699; 210/708; 210/925

(58) Field of Classification Search
CPC .... B01D 11/00; B01D 11/04; B01D 11/0496; C02F 1/68; C02F 1/681; C02F 1/682; C02F 2101/32; C02F 2101/325; C02F 2103/007; C02F 2103/08; B08B 7/00; C09K 8/52; C09K 8/524; C07F 5/50; C07C 381/12; C07C 2901/00
USPC ......... 210/634, 639, 698–700, 773, 776, 925; 210/696, 708; 208/311, 323, 336, 339; 134/40; 252/175; 507/240, 256; 564/281; 568/8, 9, 18
See application file for complete search history.

(56) References Cited

U.S. PATENT DOCUMENTS

| | | | | |
|---|---|---|---|---|
| 2,772,310 | A | * | 11/1956 | Morris .......................... 564/288 |
| 3,077,929 | A | * | 2/1963 | Fetkovich et al. ............ 166/304 |
| 3,281,365 | A | * | 10/1966 | Moedritzer .................... 510/390 |
| 3,320,141 | A | * | 5/1967 | Cisney et al. ................. 205/445 |
| 3,415,745 | A | * | 12/1968 | Isaacson et al. ............... 210/734 |
| 3,457,168 | A | * | 7/1969 | Malmberg et al. .............. 516/67 |
| 3,959,155 | A | | 5/1976 | Montgomery et al. |
| 3,980,566 | A | | 9/1976 | Peterson |
| 4,053,493 | A | | 10/1977 | Oswald |
| 4,234,692 | A | * | 11/1980 | Favie .............................. 521/33 |
| 4,267,337 | A | | 5/1981 | Lewis et al. |
| 4,297,487 | A | | 10/1981 | Mueller |
| 4,420,573 | A | | 12/1983 | Fogg et al. |
| 4,587,483 | A | | 5/1986 | Connell et al. |
| 4,640,786 | A | | 2/1987 | Soderquist et al. |
| 4,673,509 | A | * | 6/1987 | Davis et al. ................... 210/699 |
| 4,802,985 | A | * | 2/1989 | Sugimori et al. ........... 210/502.1 |
| 4,874,526 | A | * | 10/1989 | Grade et al. .................. 210/697 |
| 4,933,328 | A | | 6/1990 | Curtze et al. |
| 5,035,804 | A | | 7/1991 | Stowe |
| 5,102,874 | A | | 4/1992 | Lintner et al. |
| 5,135,578 | A | | 8/1992 | Billings |

(Continued)

*Primary Examiner* — Joseph Drodge
(74) *Attorney, Agent, or Firm* — Dunlap Codding, P.C.

(57) ABSTRACT

The clean-up of crude oil is accomplished using an oil solubilizing agent from a class of onium halides to solubilize the oil in water. The oil solubilizing agent includes a quaternary phosphonium halide, a quaternary ammonium halide, or a ternary sulfonium halide. The onium halide also includes a hydrophobic hydrocarbon chain having from 10 to 24 carbon atoms, and can include both aromatic and aliphatic components.

26 Claims, 1 Drawing Sheet

WHEREIN R = $C_{12}$ - $C_{20}$ AND X = Cl, Br, I, F

(56) References Cited

U.S. PATENT DOCUMENTS

| | | | |
|---|---|---|---|
| 5,154,831 A * | 10/1992 | Darian et al. | 210/639 |
| 5,160,488 A | 11/1992 | Stillman | |
| 5,385,675 A | 1/1995 | Vroman et al. | |
| 5,407,575 A | 4/1995 | Vinsonhaler | |
| 5,609,667 A | 3/1997 | Dickerson | |
| 5,611,363 A | 3/1997 | Campbell et al. | |
| 5,654,379 A | 8/1997 | Powers et al. | |
| 5,858,941 A * | 1/1999 | Oakes et al. | 510/179 |
| 6,035,868 A * | 3/2000 | Kennedy et al. | 134/1.1 |
| 6,080,885 A | 6/2000 | Sugiya et al. | |
| 6,261,463 B1 | 7/2001 | Jacob et al. | |
| 6,262,002 B1 | 7/2001 | Carey | |
| 6,458,343 B1 | 10/2002 | Zeman | |
| 6,464,005 B1 | 10/2002 | Ellis | |
| 6,464,900 B1 | 10/2002 | Kmec et al. | |
| 6,531,055 B1 * | 3/2003 | Greaney | 208/263 |
| 6,596,793 B2 | 7/2003 | Yamashita et al. | |
| 6,596,911 B2 | 7/2003 | Przybylinski et al. | |
| 7,094,902 B2 | 8/2006 | Roberts et al. | |
| 7,238,716 B2 | 7/2007 | Momose et al. | |
| 7,390,844 B2 | 6/2008 | Leon et al. | |
| 7,442,760 B2 | 10/2008 | Roberts et al. | |
| 7,704,939 B2 | 4/2010 | Suzuki et al. | |
| 7,737,307 B2 | 6/2010 | Murphy et al. | |
| 7,763,055 B2 | 7/2010 | Pescher et al. | |
| 8,003,574 B2 * | 8/2011 | Debord et al. | 507/90 |
| 8,227,382 B2 * | 7/2012 | Dakin et al. | 507/203 |
| 2006/0124302 A1 * | 6/2006 | Gupta et al. | 166/279 |
| 2007/0125716 A1 * | 6/2007 | Procter et al. | 210/708 |
| 2007/0163923 A1 * | 7/2007 | Nakatsu et al. | 208/370 |
| 2010/0288498 A1 * | 11/2010 | Moore et al. | 166/305.1 |
| 2011/0257328 A1 * | 10/2011 | Debord | 524/555 |
| 2012/0329915 A1 * | 12/2012 | Rey et al. | 524/17 |

\* cited by examiner

WHEREIN R = C₁₂ - C₂₀ AND X = Cl, Br, I, F

WHEREIN R = C₁₂ - C₂₀ AND X = Cl, Br, I, F

CHEMICALS FOR OIL SPILL CLEANUP

CROSS REFERENCE TO RELATED APPLICATIONS

This application claims the benefit under 35 U.S.C. 119(e) of U.S. Provisional Application Ser. No. 61/378,475, filed Aug. 31, 2010, the contents of which are hereby expressly incorporated by reference herein in its entirety.

STATEMENT REGARDING FEDERALLY SPONSORED RESEARCH OR DEVELOPMENT

Not applicable.

BACKGROUND OF THE INVENTION

1. Field of Invention

The inventive concepts disclosed and claimed herein relate generally to improved methods for clean-up of oil spills and, more particularly, but not by way of limitation, to methods for clean-up of oil spills using onium halides to disperse and solubilize chemical constituents of the oil.

2. Brief Description of Related Art

Oil spills have become an international problem. Oil spills often result from oil tanker accidents; however, a number of other causes of oil spills exist including offshore drilling spills and blow-outs, land run-off, natural seepage, etc. The toxic nature of crude petroleum makes such spills a hazard to life in the oceans, on the oceans, and by the oceans, presenting a toxic environment for marine life, waterfowl, and other animals until effectively cleaned up. The most general means for clean-up are physical in nature: burns, containment booms, sorbents, and vacuums (pumps).

Use of chemicals in oil spill clean-up gets only minor consideration because of their general lack of effectiveness. For example, the COREXIT™ 9500 Dispersant used in the 2010 Gulf of Mexico oil spill, is not technically a dispersant, but rather an emulsifier causing water-in-oil emulsions. Proposed here are a class of chemicals that are not only useful for cleaning oil-contaminated areas, they are very effective for the clean-up of oil spills.

To this end, a need exists for methods capable of remediating oil contamination and for clean-up of oil spills. It is to such a process that the inventive concepts disclosed and claimed herein are directed.

SUMMARY OF THE INVENTION

A method for dissolving crude oil in water is provided and includes the following steps. An oil solubilizing composition comprising an onium halide is added to the crude oil. The onium halide can be phosphonium, sulfonium, ammonium, nitronium or mixtures thereof. In one embodiment the onium halide is a quaternary phosphonium halide having the general formula:

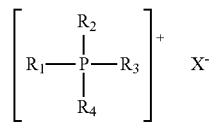

wherein $R_1$ is an alkyl of 10 to about 24 carbon atoms; $R_2$ and $R_4$ are independently methyl, ethyl or propyl groups; $R_3$ is methyl, ethyl or benzyl, and $X^{\ominus}$ is chloride, bromide, iodide or mixtures thereof. Sufficient water is provided, if necessary, to allow for dissolution of the crude oil.

In another embodiment, a method for dissolving crude oil in water includes adding an oil solubilizing composition comprising an onium halide to the crude oil. The onium halide is a quaternary phosphonium halide, a quaternary ammonium halide, and/or a ternary sulfonium halide. The onium halide also includes a hydrophobic hydrocarbon chain having from 10 to 24 carbon atoms. Sufficient water is provided, if necessary, to allow for dissolution of the crude oil. The use of an onium halide having a hydrophobic hydrocarbon chain allows for dissolving spilled crude oil in a marine environment such that the characteristics of the crude petroleum become essentially like the salt water into which it was spilled.

DETAILED DESCRIPTION OF EXEMPLARY EMBODIMENTS

Figure 1:
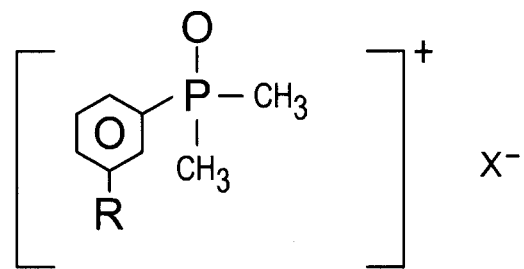
FIG. 1 is a simplified representation of additional generic structures for aromatic quaternary compounds of an embodiment of the present invention.

Before explaining at least one embodiment of the invention in detail, it is to be understood that the invention is not limited in its application to the experiments, exemplary data, and/or the arrangement of the components set forth in the following description. The invention is capable of other embodiments or of being practiced or carried out in various ways. Also, it is to be understood that the terminology employed herein is for purpose of description and should not be regarded as limiting.

As used herein, "emulsify" means to form a stable dispersion or suspension of very small droplets or particles. To "disperse" is defined herein to mean to "break-up and scatter" and refers to droplets and particles. To "solubilize" or to make "go into solution" is defined herein and in the appending claims as dissolving to form a homogeneous mixture and includes the mechanisms of micellar solubilization. Previous attempts to chemically remediate oil spills have relied on absorption, emulsion or dispersion. Presently disclosed and claimed methods actually solubilize the oil.

It is understood by those skilled in the art that surfactant molecules can form colloidal aggregates known as micelles which are often capable of increasing the solubility of organic molecules in water. The mechanism by which this solubilization occurs is the incorporation of the organic molecule into the micelle. Thus an aqueous micellar solution is distinct from a true aqueous solution, and the amount of the organic solubilized in the micellar solution can be significantly higher than the regular solubility of the organic. However, both are considered a homogeneous mixture and are referred to herein by the terms "solubilize," "dissolution" and "go into solution."

The present invention relates to the use of an oil solubilizing composition comprising aromatic and/or aliphatic classes of onium halides for the treatment of oil spills. The classes of onium halides include phosphonium, sulfonium, ammonium, and nitronium products. A solution containing the described chemical or oil solubilizing agent can be spray-applied to the oil spill, which then disperses the oil, rendering the coagulated mass into a component which readily dissolves in the water which it contaminated. In one embodiment, a chemical which very effectively dissolves the oil is dodecyl benzyldimethyl phosphonium bromide.

In one embodiment, a quaternary phosphonium halide is used having the general formula:

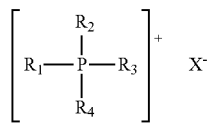

wherein $R_1$ is an alkyl of 10 to about 24 carbon atoms; $R_2$ and $R_4$ are independently methyl, ethyl or propyl groups; $R_3$ is methyl, ethyl, propyl or benzyl, and $X^{\ominus}$ is chloride, bromide, iodide or mixtures thereof. In some embodiments, $R_1$ has a chain length of about 12 to about 20 carbons.

In addition to the above quaternary phosphonium halide, other phosphonium; compounds and oniums such as sulfonium, ammonium, and nitronium can be utilized. Nonlimiting examples of suitable quaternary compounds suitable for solubilizing crude oils include hexyldecyltrimethylphosphonium bromide, hexyldecyl benzyldimethylammonium bromide, heptyltrimethylphosphonium chloride, dodecyltrimethylphosphonium iodide, dodecylbenzyldimethylphosphonium bromide, hexyldecylbenzyldimethylphosphonium bromide, dodecylbenzyldimethylphosphonium chloride, dodecylbenzyltrimethylphosphonium bromide, and the like. Quaternary onium salts can be purchased from chemical suppliers such as Sigma-Aldrich Corporation, or readily manufactured using the desired onium and halide structures.

Figure 2:
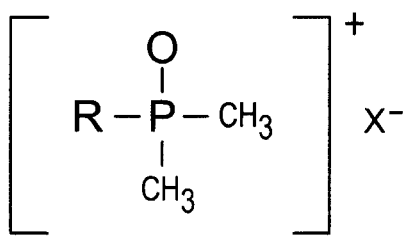
FIG. 2 is a simplified representation of additional generic structures for aliphatic quaternary compounds of an embodiment of the present invention

FIGS. 1 and 2 illustrate additional generic examples of oil solubalizing agents. Aromatic phosphonium series include structures having either benzyl or phenyl of mono-, di-, or tri-substitution. Substituted methyl groups in the aliphatic series are either mono-, di-, or tri-. The examples shown in FIGS. 1 and 2 are phosphonium and include an oxygen moiety; however other oxygenated and non-oxygenated onium compounds such as sulfonium, ammonium, and nitronium can also be used. Suitable anions include halides such as chloride, bromide, iodide and fluoride. Suitable carbon chain lengths can vary from about 10 to 24 carbons.

Surprisingly, it was discovered that quaternary onium halides as described above cause oil, such as crude oil, to immediately dissolve in water rendering the oil in solution. It is commonly known to those skilled in the art that by dissolving the crude into sea water, the natural events of nature will destroy the micelle forms of the crude. This has been shown to occur up to depths of at least 18 inches.

While oil emulsification and micellar solubilization of organic contaminants are known processes, it has not previously been known that oil, including crude oil, can be solubilized into water using onium halides as described above and as described in the attached claims. Use of onium halides in fabric softeners and anti-static compositions was described in U.S. Pat. No. 3,959,155. Phosphonium salt-containing corrosion inhibitors for high density brines were discussed in U.S. Pat. No. 4,640,786, wherein triphenyl dodecyl phosphonium chloride provided such corrosion inhibition. Also, tetraalkyl aluminosilicates were produced by ion exchange reaction of metal aluminosilicates with phosphonium salts as discussed in U.S. Pat. No. 4,053,493. However, these descriptions do not disclose or suggest the solubilization of crude oil into water using the onium halides as in the inventive concepts disclosed and claimed herein.

The onium halide need not be purified but can be used in the total dilution to the activity desired in the product solvent. It has been demonstrated using a method described herein that, unexpectedly, the oil is almost instantly dissolved in the brine taking on the physical and chemical characteristics of the brine. The crude completely loses its "oily" property.

The onium halide salts can be readily dissolved in water and can be combined with water and oxygenates to form the oil solubilizing composition. Suitable oxygenates include, but are not limited to, alcohols, glycols, alkyl ethers of glycol, glycerin, carboxylates, and ketones. In one embodiment, the onium halides are present in a solvent such as water, isopropanol, propylene glycol, or mixtures thereof. In another embodiment, the onium halides are dissolved in water to form the oil solubilizing composition.

The onium halide can be present in the oil solubilizing composition in a wide range of compositions. Typically, the onium halide is present in the oil solubilizing composition in an amount in the range of from about 5 vol % to about 95 vol % based on the total volume of the oil solubilizing composition.

The application should be expected to include spraying the oil solubilizing composition directly onto the oil layered on the water and/or directly on the oil coating coastal growth, beaches, or fowls and animals. Using water, rinsing the coated objects should remove the contamination readily. If the spill event can tolerate it, the treatment can also be applied directly into the source of the spill. In some embodiments, the oil solubilizing composition is contacted with the crude oil in an amount in the range of from about 5 ppm to about 250 ppm based on the volume of crude oil. In yet another embodiment, the oil solubilizing composition is contacted with the crude oil in an amount in the range of from about 25 ppm to about 100 ppm based on the volume of crude oil.

In order to further illustrate the presently claimed and disclosed inventive concepts, the following examples are given. However, it is to be understood that the examples are for illustrative purposes only and are not to be construed as limiting the scope of the invention. The chemistries are provided as useful compounds which are included in the inventive classes of chemicals that can be used to treat oil clean-ups, but the invention should not be limited to only these. The invention covers all compounds, singularly or mixed, which fall within the class description above. The invention should not be limited to the chemicals specified, for anyone skilled in this art could prepare a compound outside of the listed examples.

One must also realize that all crude petroleums are not the same. They contain varying amounts of paraffin, asphaltene, and porphyrins, so it is logical that one chemistry could be more effective than another. Therefore, the chemistries within the inventive concept(s) disclosed herein can run from the simple compound to more complex compounds so as to provide the most effective treatment for the oil spill.

EXAMPLE I

Laboratory testing of the above principle is illustrated in this example. About 5 liters of NaCl brine was poured into an 11-liter glass jar and a 5 ml volume of crude was added on top of the brine. About 25 ml of a test chemical with 25% active ingredient was placed into the clean spray bottle. In this example the active ingredient was dodecylbenzyldimethyl phosphonium bromide. Prior to use, the spray bottle was "thumb-pumped" to eject the test chemical and fill the pump. The spray pump was then pressed one time over the top of the crude.

Upon contact the test chemical instantly caused the oil to no longer resemble crude. The test chemical caused the crude to "dissolve" in the brine. About the top 1-inch of brine developed a color resembling a very dilute tea. There was no longer an oily trait to the test solution.

The dissolving properties achieved using the inventive concepts disclosed herein are superior to other known processes which either merely emulsify or disperse the oil. The solution containing dissolved crude oil presents a medium which should be easily destroyed by natural processes.

EXAMPLE 2

Figure 3:
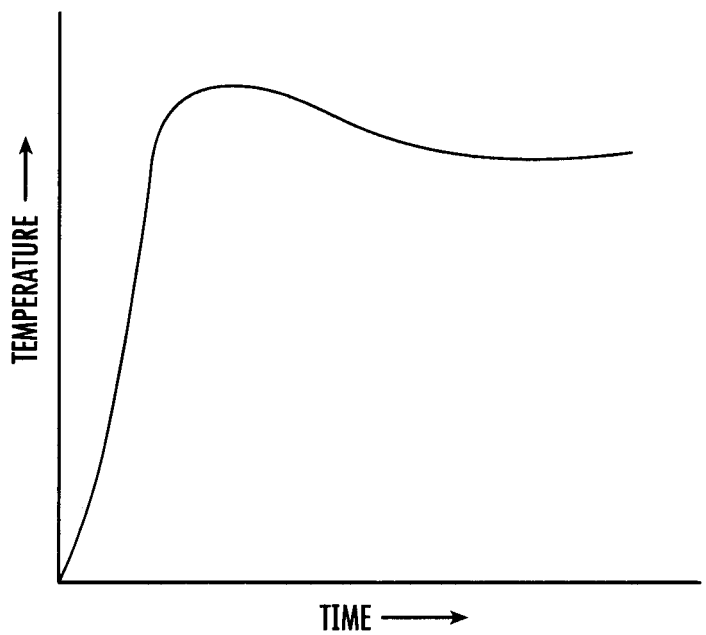
FIG. 3 is a graph illustrating the shape of the curve representing a typical quaternary reaction temperature as a function of time.

It is often cost-effective to manufacture the desired quaternary onium salt. This is accomplished by mixing the desired onium structure with a halide structure using methods known to those skilled in the art. FIG. 3 is a drawing which illustrates the typical quaternary reaction temperature as a function of time. The distinguishing features are the rapid rise in temperature to reach reaction processes and the time it takes to complete the reaction at a constant temperature. The temperature rises due to heat input, and the temperature overshoots because of the "heat of reaction." The temperature then slowly subsides as the reaction nears completion. The constant temperature line indicates a completed reaction, wherein the products are now a quaternary. Generally, when the reaction is complete, there is a color change.

EXAMPLE 3

Toxicity tests were conducted using fresh water minnows. The fresh water minnows were placed in test water containing 25 ppm dodecylbenzyldimethyl phosphonium bromide and in a control water sample without the phosphonium bromide. The number of fresh water minnows dying over a given time in the test water was about the same as in the control.

From the above description, it is clear that the inventive concepts disclosed and claimed herein are well adapted to carry out the objects and to attain the advantages mentioned herein as well as those inherent in the inventive concepts disclosed and claimed. While presently preferred embodiments of the invention have been described for purposes of this disclosure, it will be understood that numerous changes may be made which will readily suggest themselves to those skilled in the art and which are accomplished within the spirit of the inventive concepts disclosed and as defined in the appended claims.

What is claimed is:

1. A method for solubilizing crude oil in water, the method comprising the following steps:
   adding an oil solubilizing composition to the crude oil, the oil solubilizing composition comprising a quaternary phosphonium halide having the general formula:

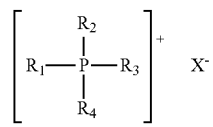

wherein $R_1$ is an alkyl of 10 to about 24 carbon atoms; $R_2$ and $R_4$ are independently methyl, ethyl or propyl groups; $R_3$ is methyl, ethyl or benzyl, and $X^-$ is chloride, bromide, iodide or mixtures thereof; and
   adding water, if not already present, and solubilizing the crude oil in the water employing micellar solubilization.

2. The method of claim 1, wherein the oil solubilizing composition comprises dodecylbenzyldimethyl phosphonium bromide.

3. The method of claim 1, further comprising the step of allowing the oil solubilizing composition to solubilize the crude oil in the water.

4. The method of claim 1, further comprising the step of allowing nature to remediate the solubilized crude oil.

5. The method of claim 1, wherein the crude oil is present in a marine environment.

6. The method of claim 1, wherein the oil solubilizing composition further comprises water and an oxygenate, the oxygenate selected from the group consisting of alcohols, glycols, alkyl ethers of glycol, glycerin, carboxylates, ketones, and mixtures thereof.

7. The method of claim 1, wherein the oil solubilizing composition comprises the quaternary phosphonium halide dissolved in a solvent, the solvent selected from the group consisting of water, isopropanol, propylene glycol, and mixtures thereof.

8. The method of claim 1, wherein the quaternary phosphonium halide is present in the oil solubilizing composition in an amount in the range of from about 5 vol % to about 95 vol %, based on the total volume of the oil solubilizing composition.

9. The method of claim 1, wherein the oil solubilizing composition is contacted with the crude oil in an amount in the range of from about 5 ppm to about 250 ppm based on the volume of crude oil.

10. The method of claim 1, wherein the oil solubilizing composition comprises the quaternary phosphonium halide dissolved in water.

11. A method for dissolving crude oil in water, the method comprising the following steps:
    adding an oil solubilizing composition comprising an onium halide to the crude oil, the onium halide including a ternary sulfonium halide; wherein the onium halide also includes a hydrophobic hydrocarbon chain having from 10 to 24 carbon atoms; and
    adding water, if not already present, and solubilizing the crude oil in the water employing micellar solubilization.

12. The method of claim 11, wherein the onium halide further includes aromatic structures.

13. The method of claim 11, wherein the onium halide includes a phosphonium cation moiety.

14. The method of claim 11, wherein the oil solubilizing composition further comprises a solvent selected from the group consisting of water and an oxygenate, the oxygenate selected from alcohols, glycols, alkyl ethers of glycol, glycerin, carboxylates, ketones, and mixtures thereof.

15. The method of claim 11, wherein the onium halide is present in the oil solubilizing composition in an amount in the range of from about 5 vol % to about 95 vol %, based on the total volume of the oil solubilizing composition.

16. The method of claim 11, wherein the oil solubilizing composition is contacted with the crude oil in an amount in the range of from about 5 ppm to about 250 ppm based on the volume of crude oil.

17. The method of claim 11, wherein the composition is contacted with the crude oil in an amount in the range of from about 5 ppm to about 250 ppm based on the volume of crude oil.

18. The method of claim 11, wherein the onium halide further includes substitutionary methyl groups selected from the group consisting of mono-, di-, and tri-.

19. The method of claim 11, wherein the onium halide further includes a paraffinic addition having a chain length of from 12 to 20 carbons.

20. The method of claim 11, wherein the onium halide includes a halide selected from Cl, Br, I and mixtures thereof.

21. The method of claim 11, wherein the oil solubilizing composition comprises the onium halide dissolved in water.

22. The method of claim 1, wherein the composition comprises the oil solubilizing agent dissolved in a solvent, the solvent selected from the group consisting of water, isopropanol, propylene glycol, and mixtures thereof.

23. A method for solubilizing crude oil in water, the method comprising the following steps:
   adding an oil solubilizing composition to the crude oil, the oil solubilizing composition comprising a quaternary phosphonium halide dissolved in isopropanol, the quaternary phosphonium halide having the general formula:

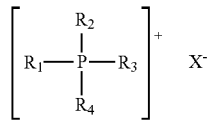

wherein $R_1$ is an alkyl of 10 to about 24 carbon atoms; $R_2$ and $R_4$ are independently methyl, ethyl or propyl groups; $R_3$ is methyl, ethyl or benzyl, and $X^-$ is chloride, bromide, iodide or mixtures thereof; and
   adding water to the crude oil, if not already present, and solubilizing the crude oil in the water employing micellar solubilization.

24. A method for solubilizing crude oil in water, the method comprising the following steps:
   adding an oil solubilizing composition to the crude oil, the oil solubilizing composition comprising a quaternary phosphonium halide dissolved in propylene glycol, the quaternary phosphonium halide having the general formula:

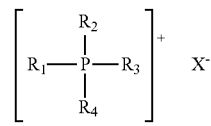

wherein $R_1$ is an alkyl of 10 to about 24 carbon atoms; $R_2$ and $R_4$ are independently methyl, ethyl or propyl groups; $R_3$ is methyl, ethyl or benzyl, and $X^-$ is chloride, bromide, iodide or mixtures thereof; and
   adding water to the crude oil, if not already present, and solubilizing the crude oil in the water employing micellar solubilization.

25. A method for dissolving crude oil in water, the method comprising the following steps:
   adding to the crude oil an oil solubilizing composition comprising an onium halide dissolved in isopropanol, the onium halide selected from the group consisting of quaternary phosphonium halide, quaternary ammonium halide, and ternary sulfonium halide, wherein the ternary sulfonium halide includes a hydrophobic hydrocarbon chain having from 10 to 24 carbon atoms; and
   adding water to the crude oil, if not already present, and solubilizing the crude oil in the water employing micellar solubilization.

26. A method for dissolving crude oil in water, the method comprising the following steps:
   adding to the crude oil an oil solubilizing composition comprising an onium halide dissolved in propylene glycol, the onium halide selected from the group consisting of quaternary phosphonium halide, quaternary ammonium halide, and ternary sulfonium halide, wherein the ternary sulfonium halide includes a hydrophobic hydrocarbon chain having from 10 to 24 carbon atoms; and
   adding water to the crude oil, if not already present, and solubilizing the crude oil in the water.

* * * * *